(12) United States Patent
Noh et al.

(10) Patent No.: US 8,392,201 B2
(45) Date of Patent: Mar. 5, 2013

(54) METHOD AND SYSTEM FOR DISTRIBUTED AUDIO TRANSCODING IN PEER-TO-PEER SYSTEMS

(75) Inventors: Jeonghun Noh, Palo Alto, CA (US); Bernd Girod, Stanford, CA (US); Peter Pogrzeba, Berlin (DE); Sachin Kumar Agarwal, Berlin (DE); Jatinder Pal Singh, Mountain View, CA (US); Kyu-Han Kim, Redwood City, CA (US)

(73) Assignees: Deutsche Telekom AG, Bonn (DE); The Board of Trustees of the Leland Stanford Junior University, Stanford, CA (US)

( * ) Notice: Subject to any disclaimer, the term of this patent is extended or adjusted under 35 U.S.C. 154(b) by 270 days.

(21) Appl. No.: 12/847,480

(22) Filed: Jul. 30, 2010

(65) Prior Publication Data

US 2012/0029911 A1 Feb. 2, 2012

(51) Int. Cl.
*G10L 19/00* (2006.01)
*G10L 19/02* (2006.01)

(52) U.S. Cl. ......... 704/500; 704/205; 370/469; 709/231
(58) Field of Classification Search .................. 704/205, 704/206, 500, 501; 370/469; 709/231
See application file for complete search history.

(56) References Cited

U.S. PATENT DOCUMENTS

| | | | |
|---|---|---|---|
| 6,108,625 A * | 8/2000 | Kim .............................. | 704/229 |
| 6,182,031 B1 | 1/2001 | Kidder et al. | |
| 6,211,801 B1 * | 4/2001 | Girod ............................... | 341/67 |
| 6,349,284 B1 * | 2/2002 | Park et al. ...................... | 704/500 |
| 7,222,285 B2 | 5/2007 | Chou et al. | |
| 7,283,966 B2 * | 10/2007 | Zhang et al. .................. | 704/500 |
| 7,426,677 B2 | 9/2008 | Chou et al. | |
| 8,230,100 B2 * | 7/2012 | Shukla et al. ................. | 709/231 |
| 2003/0171934 A1 * | 9/2003 | Zhang et al. .................. | 704/500 |
| 2005/0240403 A1 * | 10/2005 | Zhou et al. ..................... | 704/229 |
| 2006/0015332 A1 * | 1/2006 | Chen et al. ..................... | 704/230 |
| 2006/0083303 A1 * | 4/2006 | Han et al. .................. | 375/240.08 |
| 2006/0244840 A1 * | 11/2006 | Eshet et al. ................ | 348/222.1 |
| 2008/0068446 A1 * | 3/2008 | Barkley et al. ............. | 348/14.07 |
| 2008/0225952 A1 * | 9/2008 | Wang et al. ............... | 375/240.16 |
| 2008/0292005 A1 * | 11/2008 | Xu et al. .................. | 375/240.28 |
| 2010/0324915 A1 * | 12/2010 | Seo et al. ....................... | 704/500 |
| 2011/0274155 A1 * | 11/2011 | Noh et al. ................ | 375/240.01 |
| 2012/0093144 A1 * | 4/2012 | Alberi-Morel et al. ....... | 370/345 |

FOREIGN PATENT DOCUMENTS

WO WO 2009/053663 * 4/2009

OTHER PUBLICATIONS 7 kHz Audio-Coding within 64 kbits/s, ITU-T Recommendation G.722 (Nov. 1988), 1988.
Dong, et al., Distributed Audio Coding in Wireless Sensor Networks, Computational Intelligence and Security, 2006 International Conference, May 2007.

(Continued)

*Primary Examiner* — Martin Lerner
(74) *Attorney, Agent, or Firm* — Leydig, Voit & Mayer, Ltd.

(57) ABSTRACT

A method for streaming audio data in a network, the audio data having a sequence of samples, includes encoding the sequence of samples into a plurality of coded base bitstreams, generating a plurality of enhancement streams, and transmitting the coded base bitstreams and the enhancement bitstreams to a receiver for decoding. Each of the enhancement bitstreams is generated from one of a plurality of non-overlapping portions of the sequence of samples.

33 Claims, 10 Drawing Sheets

OTHER PUBLICATIONS

GOYAL, Multiple Description Coding: Compression Meets the Network, IEEE Signal Processing Magazine, vol. 18, No. 5, Sep. 2001.

ISO (2003), Bandwidth extension, ISO/IEC 14496-3:2001/Amd 1:2002.

ITU-T, 40, 32, 24, 16 kbit/s Adaptive Differential Pulse Code Modulation (ADPCM), ITU-T Recommendation G.726 (Dec. 1990), 1990.

Jiang et al., Multiple Description Speech Coding for Robust Communication over Lossy Packet Networks, IEEE Int. Conference on Multimedia and Expo, ICME, New York City, NY, Jul. 2000.

Liang et al., Real-Time Voice Communication over the Internet Using Packet Path Diversity, Proceedings of the Ninth ACM International Conference on Multimedia, Oct. 2001.

MPEG. Information Technology—Generic Coding of Moving Pictures and Associated Audio, part 3: Audio. International Standard IS 13818-3, ISO/IEC JTC1/SC29 WG11, 1994.

MPEG. MPEG-2 Advanced Audio Coding, AAC. International Standard IS 13818-7, ISO/IEC JTC1/SC29 WG11, 1994.

Noh et al., Stanford Peer-to-Peer Multicast (SPPM)—Overview and Recent Extensions, Proc. of International Picture Coding Symposium (PCS), Chicago, Illinois, USA, May 2009.

Pulse Code Modulation (pcm) of Voice Frequencies, ITU-T Recommendation G.711, 1989.

ISO (2006), Audio Lossless Coding (ALS), new audio profiles and BSAC extensions, ISO/IEC 14496-3:2005/Amd 2:2006, 2006.

* cited by examiner

METHOD AND SYSTEM FOR DISTRIBUTED AUDIO TRANSCODING IN PEER-TO-PEER SYSTEMS

FIELD

The present invention is related in general to multimedia streaming and in particular, but not exclusively, to a method and system for streaming multimedia data in a peer-to-peer network.

BACKGROUND

The recent advances in networking technologies and mobile devices is allowing more and more mobile users to receive multimedia contents over wireless networks. Real-time delivery of multimedia data is called streaming. Streaming, which is typically server-based, allows users to consume contents while they download them. Recently, peer-to-peer (P2P) streaming has become popular as a potentially cost-effective alternative to server-based streaming.

In P2P systems, peers not only consume media contents, but also contribute their uplink bandwidth and/or local storage. Thus the system can scale well as users bring resources to the system. Mobile devices often connect to the network via wireless channels. But, the downlink of the wireless channel (e.g., the cellular access network) tends to be limited in throughput. The wireless channel may also suffer from channel fading or unexpected interferences, which results in throughput fluctuation. Thus, it is desirable to adjust the bitrate of the audio stream over time to adapt to channel conditions. In addition, it is desirable to adapt the audio signal to individual mobile users depending on the requirements of applications and the hardware limitations of the mobile devices (e.g., low-end built-in speaker).

The change in the bitrate or in the quality of the audio signal can be achieved by transcoding. When a mobile device connects to a peer in the P2P system, the fixed peer transcodes the original audio signal according to the unique requirements of the mobile device, including its wireless channel condition and/or its multimedia capability. However, peers in the systems are unreliable because they can leave the system anytime. When peers leave the system without prior notice, mobile users connected to the departing peers may experience temporary disruption in downloading the audio and/or unwanted disconnection from a P2P system.

SUMMARY

In an embodiment the present disclosure provides a method for streaming audio data in a network, the audio data including a sequence of samples. The method includes encoding the sequence of samples into a plurality of coded base bitstreams, generating a plurality of enhancement streams, and transmitting the coded base bitstreams and the enhancement bitstreams to a receiver for decoding. Each of the enhancement bitstreams is generated from one of a plurality of non-overlapping portions of the sequence of samples.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, in which.

DETAILED DESCRIPTION

Figure 1:
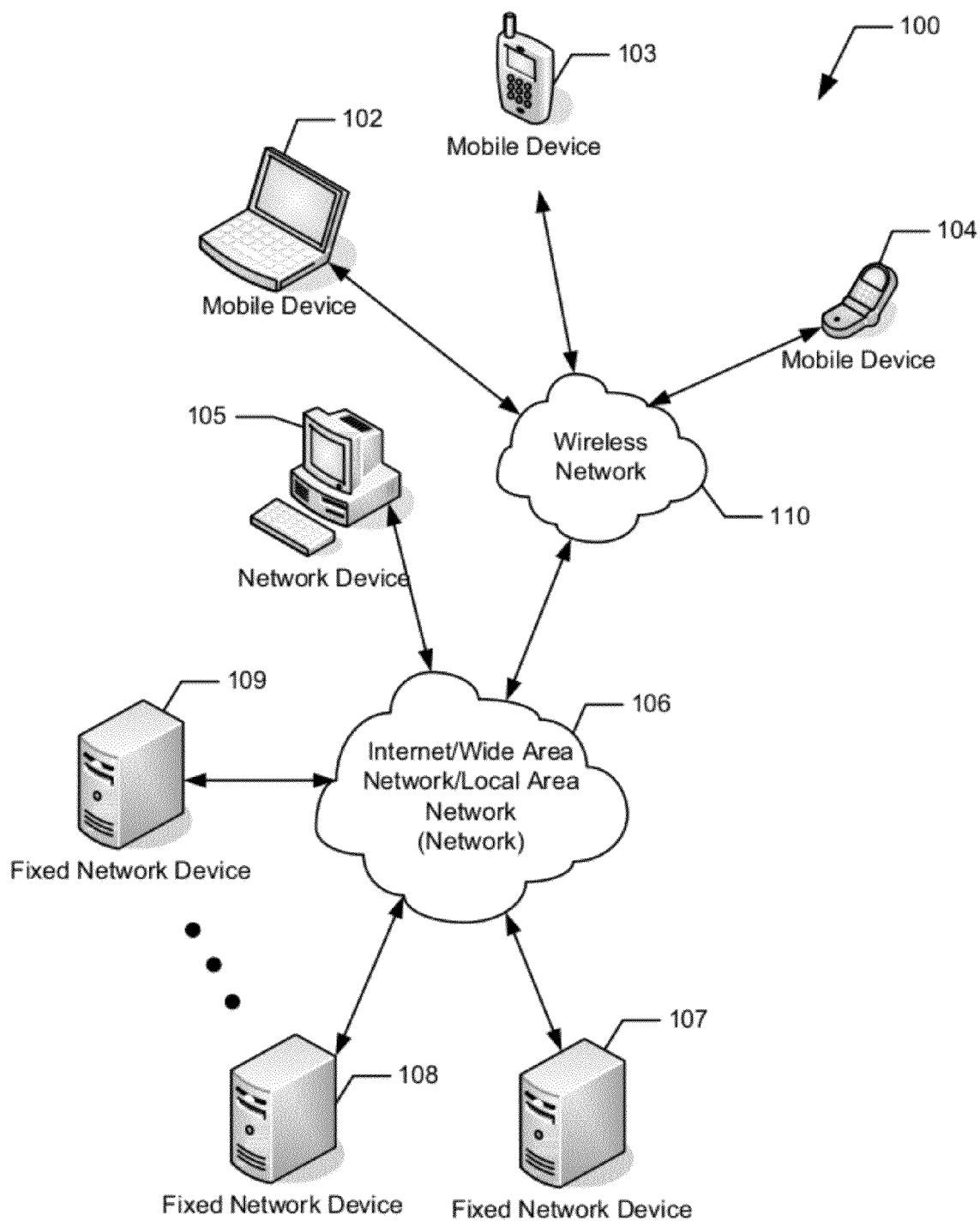
FIG. 1 depicts a network system according to one embodiment of the invention for transcoding and distributing multimedia data.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, a method and system for distributed transcoding and streaming of multimedia data such as video or audio data is provided. The method which provides robust P2P streaming for mobile users and imposes low transcoding complexity on peer devices. The system allows multiple fixed peers to perform transcoding for a mobile user. After a mobile device connects to multiple fixed nodes as its parents, each parent generates a sub-stream by transcoding the original audio. These sub-streams are transmitted and then assembled at the mobile device as if they were a single stream. If the mobile device loses some of its parents, it still receives sub-streams from the other parents and decodes the incomplete signal, which leads to graceful degradation instead of complete disruption.

Since parents are equally likely to fail, the method is based on the multiple description coding (MDC) which achieves a similar level of quality degradation, regardless of which particular parent or parents fail. The method also provides a trade-off between compression efficiency and robust streaming, determined based on several factors, such as the ordinary behavior of peers, wireless channel speed, and user requirements.

Since peers contribute their computing power for distributed transcoding, the system can prevent an individual node from being overloaded with transcoding requests from mobile users. Since transcoding burden is shifted from dedicated media servers to fixed peers, it is desired not to impose any computation-intensive transcoding responsibility on the peers in order to achieve self-scalability of a P2P system. Conforming to this spirit, the method and system described herein are based on a light-weight differential pulse coding mode (DPCM).

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 include network 106, wireless network 110, mobile devices 102-104, fixed network devices 105 and 107-109.

In general, system 100 has a Peer-to-Peer (P2P) distributed network structure including network nodes (devices) that make a portion of their resources, such as processing power, network bandwidth, or data stored thereon, directly available to other network nodes, without the need for central coordination provided by conventional servers or stable hosts. A network node, such as mobile devices 102-104 or fixed network devices 105 or 107-109, can directly request and receive data from one or more other participants and assemble the data to recover the information. For example, mobile device 102 can request audio data be sent from fixed network devices 107-109 in parallel and assemble them to form a single audio stream, which is then played back through a audio interface on mobile device 102. Because the system 100 is organized in a P2P structure, there is no server-client relationship among the devices 102-105 and 107-109. Every device can contribute to the totality of the data available within system 100.

Generally, mobile devices 102-104 may include virtually any mobile computing device capable of receiving data over a network, such as wireless network 110 or the like. Such devices include portable devices such as, cellular telephones, smart phones, radio frequency (RF) devices, infrared devices, Personal Digital Assistants (PDAs), handheld computers, laptop computers, wearable computers, tablet computers, integrated devices combining one or more of the preceding devices, or the like.

Network device 105 may include virtually any computing device that typically connects using a wired communications medium such as personal computers, multiprocessor systems, microprocessor-based or programmable consumer electronics, network PCs, or the like.

Devices that may operate as network devices 107-109 include personal computers desktop computers, multiprocessor systems, microprocessor-based or programmable consumer electronics, network PCs, servers, and the like.

In general, the fixed network devices 107-109 have higher processing power and larger disk storage and bandwidth, and, therefore, are configured to receive as well as supply resources or data to other participants in system 100. Some of the fixed network devices, on the other hand, such as device 105, have very limited processing power or storage space. Therefore, devices such as 105 are configured as consumers of data, meaning that they only receive data provided by other participants, but do not share data with other network nodes. Similarly, most mobile devices 102-104 are generally configured as data consumers, which only receive but do not supply data, because of their limited processing power, bandwidth, and storage space.

Fixed network device 107 may further provide a variety of services that include, but are not limited to web services, third-party services, audio services, video services, email services, IM services, SMS services, VOIP services, calendaring services, photo services, or the like. Content may include web content, audio content, video content, FTP data, or the like.

Wireless network 110 is configured to couple mobile devices 102-104 with network device 105. Wireless network 110 may include any of a variety of wireless sub-networks that may further overlay stand-alone ad-hoc networks, or the like, to provide a connection for mobile devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between mobile devices 102-104 and another computing device, network, or the like.

Network device 105 is configured to couple network devices 105 and 107-109 with other computing devices, including through wireless network 110 to mobile devices 102-104. Network device 105 is enabled to employ any form of computer readable media for communicating information from one electronic device to another. Also, network device 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, integrated Services Digital Networks (ISDN), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, a network includes any communication method by which information may travel between computing devices.

Illustrative Mobile Devices 102-104 and Network Device 105

Figure 2:
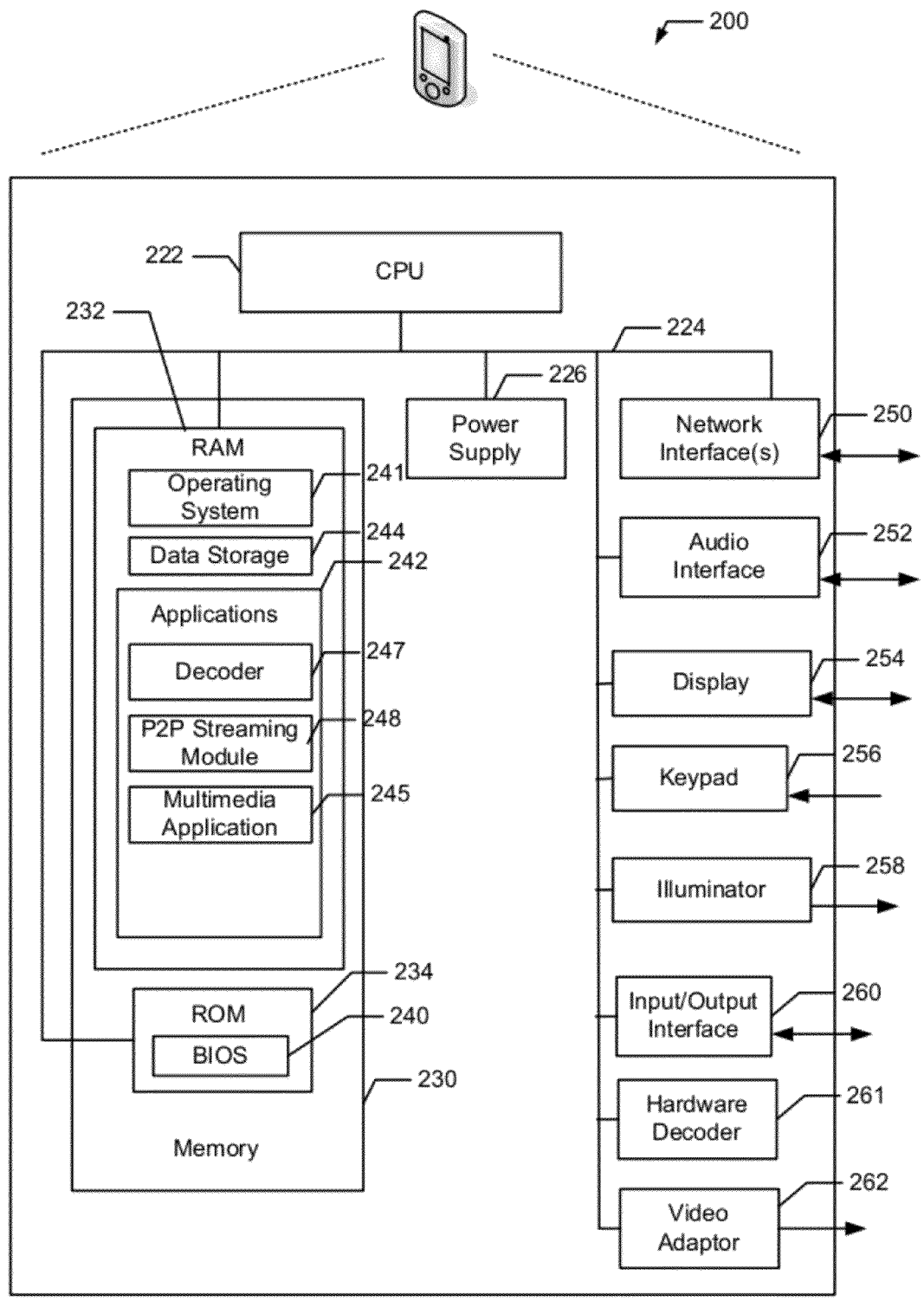
FIG. 2 depicts a schematic diagram of mobile devices 102-104 and network device 105 shown in FIG. 1.

FIG. 2 shows one embodiment of device 200 that may be included in system 100 implementing the invention. Device 200 may include many more or less components than those shown in FIG. 2. However, the components shown are sufficient to implement an illustrative embodiment for practicing the present invention. Device 200 may represent, for example, one embodiment of at least one of mobile devices 102-104 and network device 105 of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, and an input/output interface 260. Power supply 226 provides power to device 200. A rechargeable or non-rechargeable battery may be used to provide power. The power may also be provided by an external power source, such as an AC adapter or a powered docking cradle that supplements and/or recharges a battery. Device 200 further includes ROM ("234"), BIOS 240, operating system 241, data storage 244, and applications 242.

Device 200 can communicate with another computing device directly or indirectly via network interface 250. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone to enable telecommunication with others and/or generate an audio acknowledgement for some action. Audio interface 252 can further be configured to play back music signals by converting digital audio data into voice signals.

Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. In addition, device 200 may further include video adaptor 262, which is configured to provide video signals to an external display.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the device is powered. In addition, illuminator 258 may backlight these buttons in various patterns when particular actions are performed, such as dialing another device. Illuminator 258 may also cause light sources positioned within a transparent or translucent case of the device to illuminate in response to actions.

Device 200 also comprises input/output interface 260 for communicating with external devices, such as a headset. Input/output interface 260 can utilize one or more communication technologies, such as USB, infrared, Bluetooth™, or the like.

Device 200 typically ranges widely in terms of capabilities and features. For example, a cell phone 104 may have a numeric keypad and a few lines of monochrome LCD display on which only text may be displayed. In another example, a web-enabled mobile device such as a PDA 103 may have a touch sensitive screen, a stylus, and several lines of color LCD display in which both text and graphics may be displayed. In still another example, a multimedia-enabled mobile device such as laptop 102 may include a multimedia application 245 such as a video player application, which is configured to render images, videos streams, audio signals, or the like through a multimedia interface such as a color LCD or LED screen or a microphone. In still another example, device 200 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send information.

As depicted in FIG. 2, in general, device 200 also includes a decoder. In one embodiment, the decoder is part of the multimedia application 245 described above or a standalone application 247 running in parallel with the multimedia application 245 on the device. In another embodiment, the decoder is provided in a hardware module 261 as part of the hardware circuit in the device. The decoder is configured to decode multimedia data from the data stream received by the device and provide the decoded data to the multimedia application 245 such as the audio player. Depending on the coding technique used in the encoded data stream, the decoder can perform lossy or lossless decoding. The decoder may utilize proprietary decoding techniques or standardized decoding techniques defined in standard specifications.

Device 200 further includes a P2P streaming module, which is configured to process the coded data stream received from other computing devices through network interface 250 in accordance with a P2P transmission scheme. The P2P streaming module can be part of the decoder 247 or 261 as described above or can be a standalone application 248, which operates in conjunction with the decoder. In one embodiment, the P2P streaming module operates on top of the Internet Protocol (IP) or other networking protocol as well known in the art. The P2P streaming module is further configured to provides information that identifies device 200, including a type, capability, name, or the like. In one embodiment, device 200 may uniquely identify themselves through any of a variety of mechanisms, including a phone number, Mobile Identification Number (MIN), an electronic serial number (ESN), mobile device identifier, network address, or other identifier.

In a further embodiment, the P2P streaming module 248 is configured to perform peer indexing and discovery. In particular, the P2P streaming module 248 may broadcast through network interface 250 a message, such as the "Hello" message, to each network device in system 100. The message also identifies certain data, such as a digital audio file, that device 200 requests from other devices in the system. Upon receiving responses, the P2P streaming module 248 identifies a number of network devices that have the requested data and assigns an identification (ID) to each of these network devices. In addition, the P2P streaming module 248 also conducts negotiations with other network devices to determine transmission rates, bandwidth, packet size, etc. For example, the P2P streaming module 248 may examine the responses received from the network devices that carry the requested data, and select a predetermined number of network devices according to the uplink data rate or bandwidth offered by these network devices.

In addition, P2P streaming module 248 can further provide data assembling, retransmission request, and error correction. For example, P2P streaming module 248 can generate a copy of the requested data by assembling the data streams received from a plurality of computing devices in system 100. Upon discovering that one or more portions of the data are missing or contain errors, P2P streaming module 248 can request retransmissions of the unavailable data and/or correct the errors by applying an error correction method to the received data.

The operations of the P2P streaming module 248 and the decoder are further described hereinafter.

Illustrative Network Devices 107-109

Figure 3:
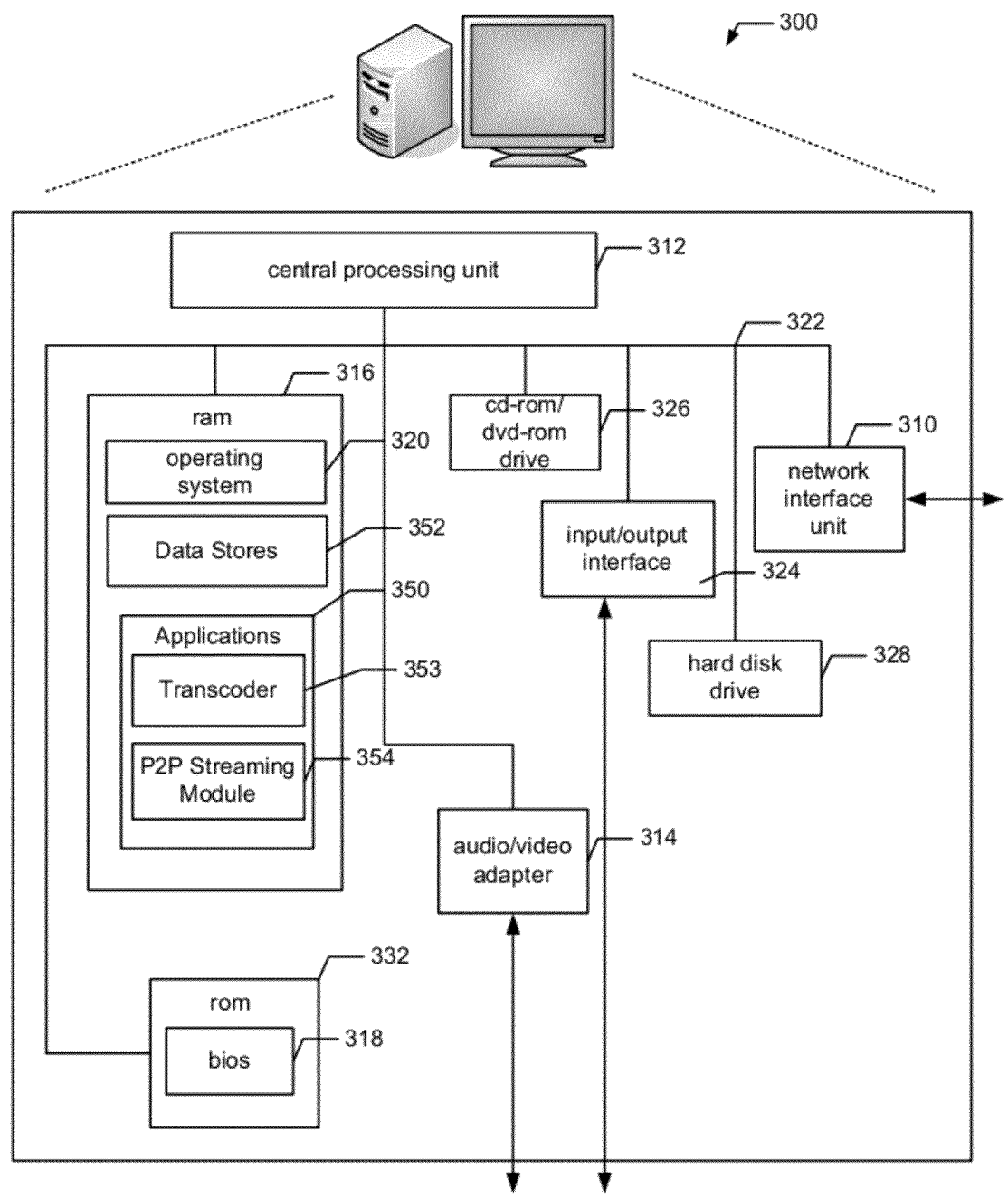
FIG. 3 depicts a schematic diagram of fixed network devices 107-109 shown in FIG. 1.

FIG. 3 shows one embodiment of network devices 300. Network device 300 may include many more or less components than those shown. The components shown, however, are sufficient to disclose an illustrative embodiment for practicing the invention. Network device 300 may represent, for example, network device 107-109 of FIG. 1 and/or network device 105 of FIG. 1.

Specifically, network device 300 includes central processing unit 312, audio/video adapter 314, and a mass memory, all in communication with each other via bus 322. The mass memory generally includes RAM 316, ROM 332, and one or more permanent mass storage devices, such as hard disk drive 328, tape drive, optical drive (such as cd-rom/dvd-mm drive 326), and/or floppy disk drive. The mass memory stores operating system 320 for controlling the operation of network device 300, and further includes data stores 352. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). The network device 300 further includes an input/output interface 324.

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by network device 300 to store, among other things, applications 350 and/or other data. RAM 316 can also be used to store database information. The mass memory also stores program code and data. One or more applications 350 are loaded into mass memory and run on operating system 320 by central processing unit 312. Examples of application programs may include transcoder 353, P2P streaming module 354, schedulers, calendars, database programs, word processing programs, HTTP programs, customizable user interface programs, IPSec applications, encryption programs, security programs, SMS message servers, IM message servers, email servers, account managers, and so forth. Alternatively, the transcoder can be implemented in the audio/video adaptor 314 as software/hardware/firmware modules.

Similar to P2P streaming module 248, P2P streaming module 354 provides various functions required by P2P transmissions, including identification of device 300 and other computing devices within system 100, indexing and discovery, data assembling, error correction, etc.

The operations of transcoder 353 and P2P streaming module 354 will be further described hereinafter.

General Operation

As depicted in FIG. 1, P2P system 100 includes a plurality of fixed nodes 105 and 107-109 and mobile nodes 102-104. Fixed nodes 107-109 are usually configured to receive original audio data emanating from an audio source as well as make the audio data available to other network nodes within the system. Network node 105 and mobile nodes 102-104 only receive audio data, but do not share them with other devices, due to their limited computational power. In system 100, the network devices 102-105 and 107-109 are generally called peers as the system does not rely on a central server or host to distribute the data.

Figure 4:
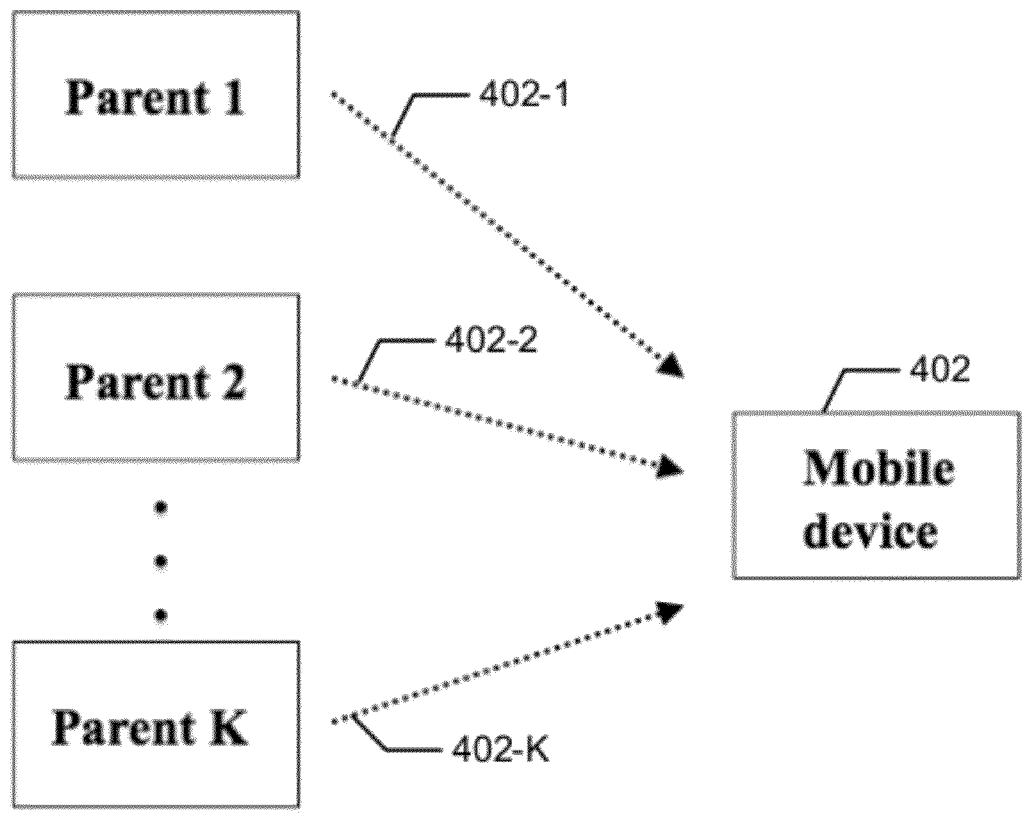
FIG. 4 depicts a four-parent scheme for providing data streaming to a network device according to one embodiment of system 100.

Generally, the original audio stream includes mono channel or stereo channels. Based on the wireless channel conditions or device/application specific requirements, the audio data are adapted by fixed devices 107-109 before being transmitted to mobile devices 102-104 or network device 105. As depicted in FIG. 4, when a new device 402, which can be any of devices 102-105 joins system 100, it searches for K fixed network nodes that have the requested data and required uplink bandwidth and processing power. After the device finds K fixed nodes as its "parents," it assigns them unique Parent IDs (from 1 to K). Then, it requests them to transcode the original audio signal for streaming. In response to the request, each of the K parents then generates and transmits a sub-stream 402-1-402-K. For the synchronization of sub-streams, each parent adds meta data to its sub-stream, such as the time stamp of an audio chunk. When a node 107-109 serving as a parent leaves the system, its child node finds a different parent node to resume the streaming process for the respective sub-stream.

Distributed Transcoding for Mono-Channel Audio

In one embodiment, the audio signals transmitted by system 100 are mono-channel audio. When the original audio stream is stereo, each parent node first decodes and then mixes the audio stream into a mono-channel audio stream for transmission.

Encoding

Figure 6A:
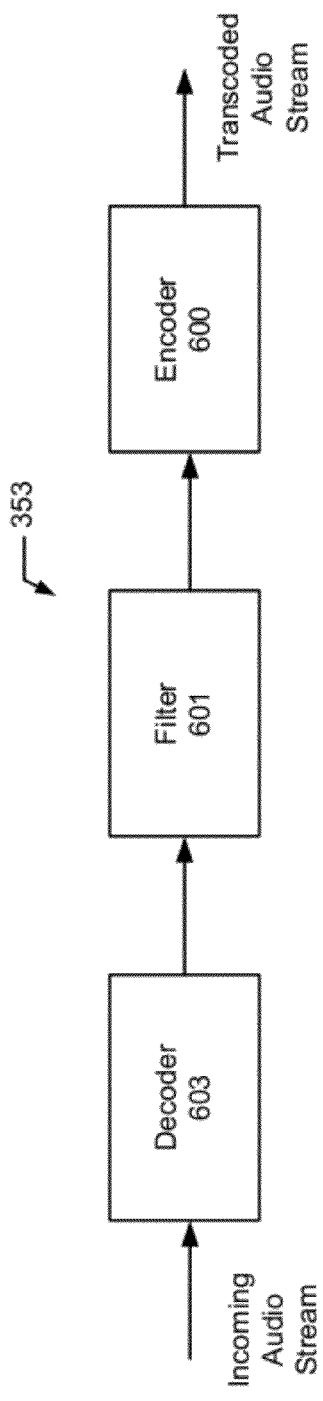
FIG. 6A depicts a schematic diagram of an audio transcoder according to one embodiment of the invention shown FIG. 3.

As shown in FIG. 6A, transcoder 353 shown in FIG. 3 includes decoder, filter, and encoder components. The decoder is used to recover the original audio signal from the audio stream received from the audio source. The decoded signal is passed through a low-pass filter 601 in order to eliminate the high frequency components. For a speech signal, the frequency above 4 KHz is eliminated to reduce the bitrate in practice. The filtered signal is then encoded by an encoder 600. The encoding can be based on the G.726 Adaptive Differential Pulse Code Modulation standard as described in "40, 32, 24, 16 kbit/s adaptive differential pulse code modulation (ADPCM)," ITU-T Recommendation G.726, December 1990, which is hereby incorporated by reference in its entirety, or can be based on any other coding technique. The decoder 603, filter 601, and encoder 600 can be implemented by programming a general digital processor and the program codes can be stored in a computer readable medium such as RAM 316 shown in FIG. 3.

The input signals to the encoder 600 include sequential audio samples. The encoder 600 codes each input sample into a number of bits (2 to 5 bits per sample in the case of the G.726 coding). The number of bits per sample, denoted as Nb, is a system parameter that influences the output bitrate and audio quality. In general, the greater Nb is, the higher the audio quality.

Figure 5:
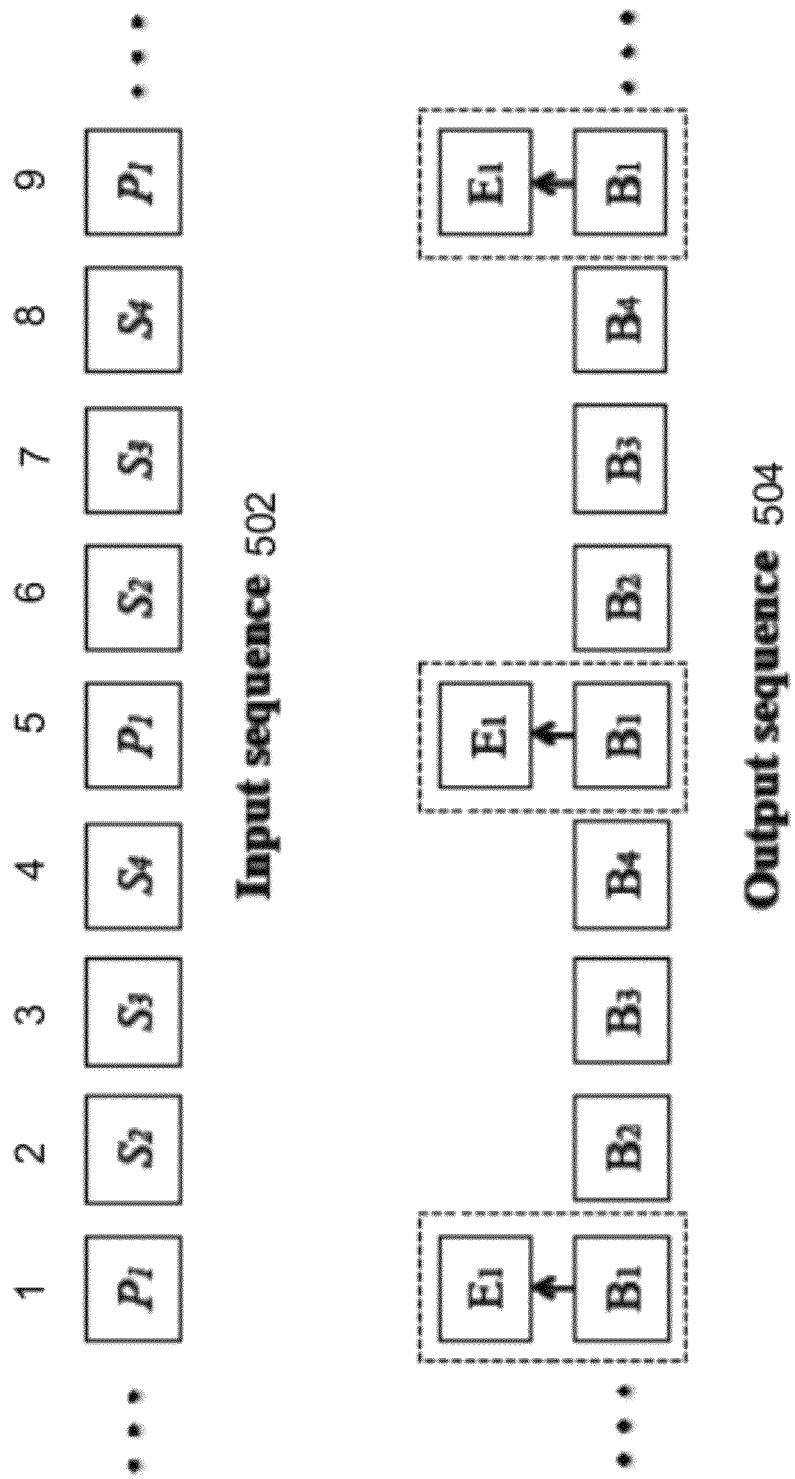
FIG. 5 depicts an input data sequence to the encoder and a output sequence generated by the encoder according to one embodiment.

In addition to encoding the audio samples, each parent refines disjointed sets of output samples, called primary samples. The remaining samples are called secondary samples. For example, Parent i refines every Kth sample starting from Sample i. FIG. 5 illustrates the inputs and outputs of the encoder for Parent 1 when the mobile receiver connects to four (4) parents. For example, Parent 1 encodes all of the samples in input sequence 502 into basic coded samples $B_1$-$B_4$, and further refines primary samples 1, 5, 9, into coded samples $E_1$. As a result, samples 1, 5, and 9 are primary samples and the rest of the samples are secondary samples. In output sequence 504 generated by Parent i, every sample is encoded as the base layer ($B_1$-$B_4$) and the primary samples are further refined with additional bits as the enhancement layer ($E_i$).

Figure 6B:
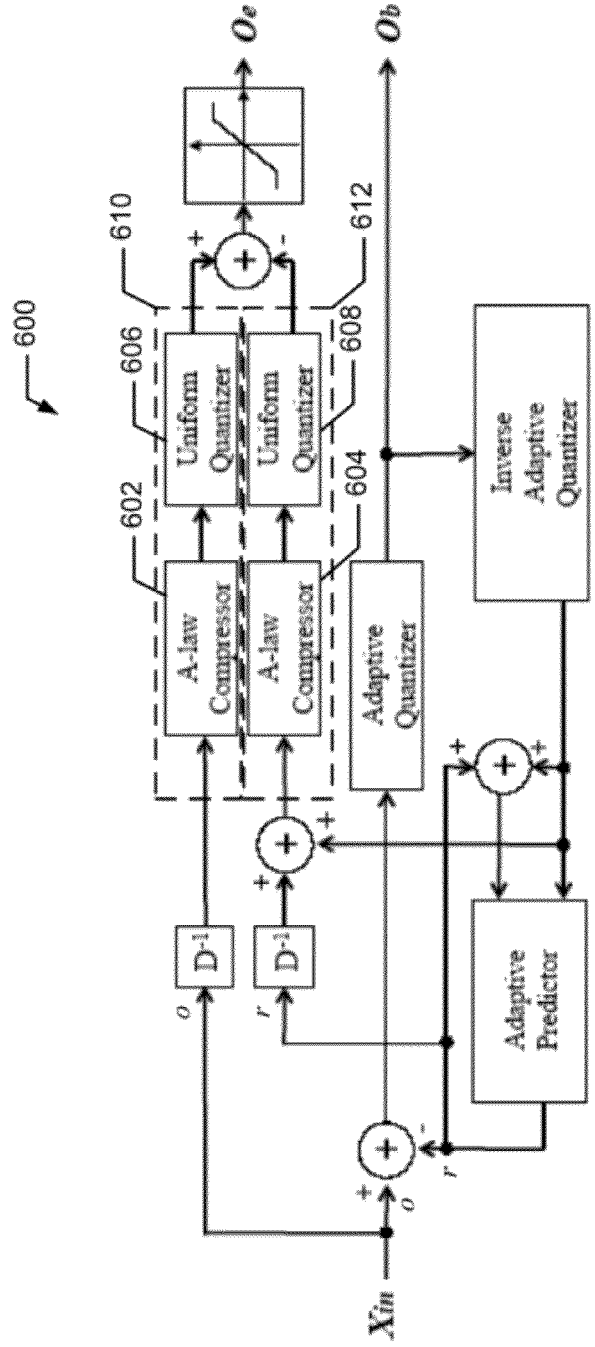
FIG. 6B depicts one embodiment of the encoder shown in FIG. 6A suitable for encoding mono-channel signals.

According to one embodiment, a schematic diagram of encoder component 600 of transcoder 353 is shown in FIG. 6B. Encoder 600 is designed for encoding mono-channel audio signals. In FIG. 6B, $X_{in}$ denotes the input sample sequence, $O_b$ denotes the encoded base layer stream, and $O_e$ denotes the encoded enhancement (refinement) layer stream whose length is one K-th of the base layer stream $O_e$.

As depicted in FIG. 6B, refinement of the primary samples is conducted by encoding the difference (e) between the original sample (o) and the reconstructed sample (r), where e=o−r. Let Ne denote the number of bits used for the refinement. To code the difference efficiently, a companding technique is used to mitigate the detrimental effects of the original sample (o) and the reconstructed sample (r) with limited dynamic range. In one embodiment, A-law compressors 602 and 604, which are based on a well-known standard companding method, are used. Alternatively, any other companding technique that compresses an independent sample, such as the μ-law technique, can also be used. Both A-law and μ-law techniques are described in "Pulse code modulation (PCM) of voice frequencies," ITU-T Recommendation G.711, 1989, which is hereby incorporated by reference in its entirety.

A-law compressors 602 and 604 effectively reduce the dynamic range of the r and o signal, thereby increasing the coding efficiency while biasing the signal in a way that results in a signal-to-distortion ratio that is greater than that obtained by linear encoding for a given number of bits. By appending a uniform scalar quantizer (606 and 608) to each of the A-law compressors 602 and 604, a non-uniform quantizer (610 and 612) with variable quantization levels is created. Signals o and r are each passed into the non-uniform quantizers 610 and 612, which adapt their quantization levels according to the value of signals r and o. When the input is small, the intervals between adjacent levels are small. As signal strength increases, the quantization intervals increase logarithmically. The difference of the quantizer outputs is encoded using Ne bits. If the difference is larger than $2^{Ne-1}$, the difference is coded as $2^{Ne-1}$. If the difference is smaller than $-2^{Ne-1}+1$, it is coded as $-2^{Ne-1}+1$.

Once the refinement is complete, each parent transmits the encoded primary and secondary samples to the mobile receiver. Each output stream from a parent is called a sub-stream. Note that the output stream ($O_b$) for the secondary samples is identical at every parent, which introduces redundancy in the encoded stream. This redundancy ensures that any single sub-stream can be successfully decoded at the mobile receiver.

Decoding

As sub-streams from parents are received by device 402, decoder 247 or 261 shown in FIG. 2 decodes and assembly the received sub-streams. The received sub-streams can be decoded one by one in series by decoder 247 or 261. Alternatively, to parallelize the decoding process, as many decoders as the number of parents may be needed. Since the decoder such as the ADPCM decoder is light-weight, using multiple software-based decoders 247 or hardware-based decoders 261 impose no excessive computing load on the device.

Figure 7:
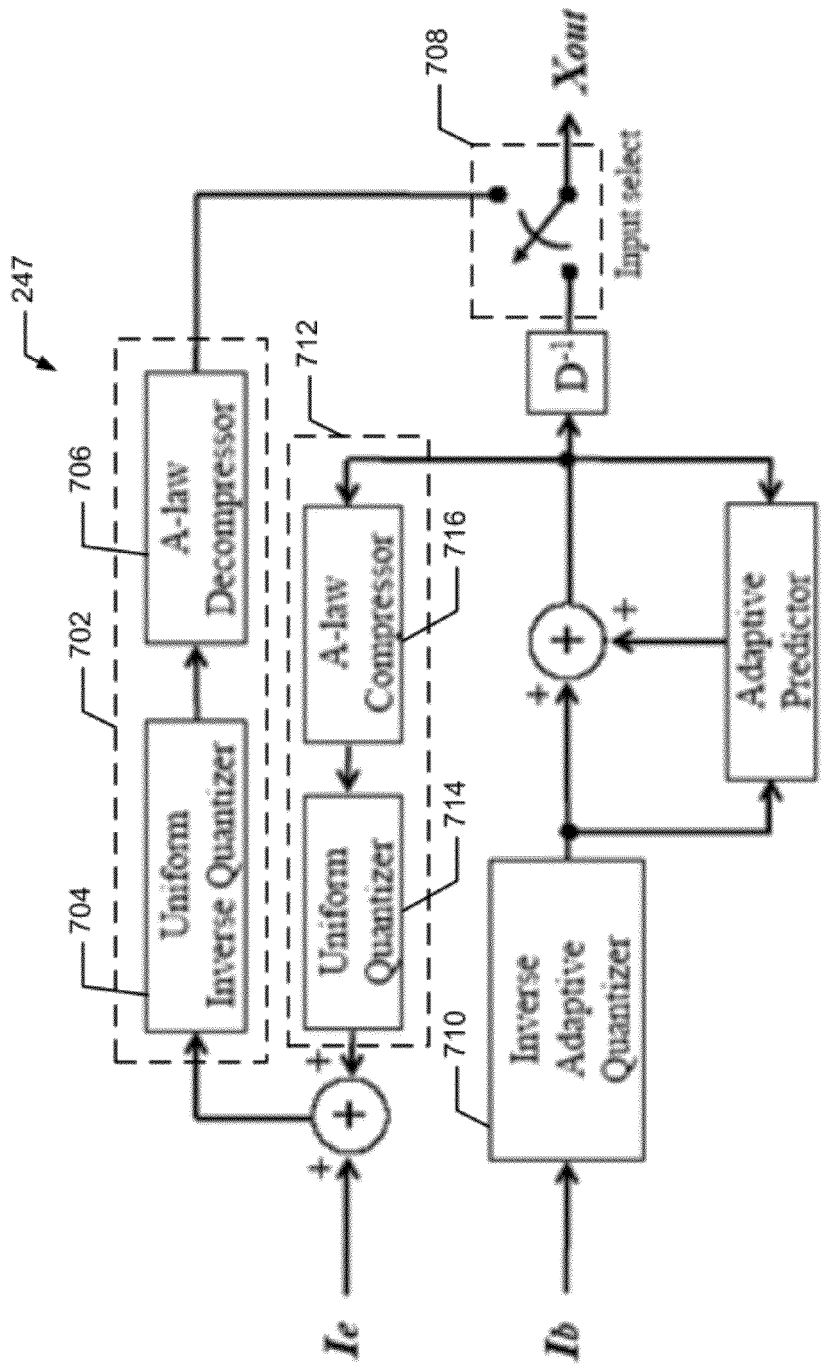
FIG. 7 depicts one embodiment of the decoder shown in FIG. 2 suitable for decoding mono-channel signals.

FIG. 7 depicts a schematic diagram of one sub-stream decoder in decoder 247 or decoder 261 according to one embodiment. The base quality audio is obtained by decoding the base stream $I_b$ of a sub-stream using a inverse adaptive quantizer 710.

In order to decode the refinement bits in the enhancement stream ($I_e$), the decoded base stream is first processed by non-uniform quantizer 702, similar to quantizer 610 and 612, including an A-law compressor 716 and an uniform quantizer 714. The quantized samples are added to the refinement bits and then decoded using non-uniform inverse quantizer 702 including uniform inverse quantizer 704 and A-law decoder 706. The output of the non-uniform inverse quantizer 702 is selected by input selector 708 only for primary samples.

Figure 8:
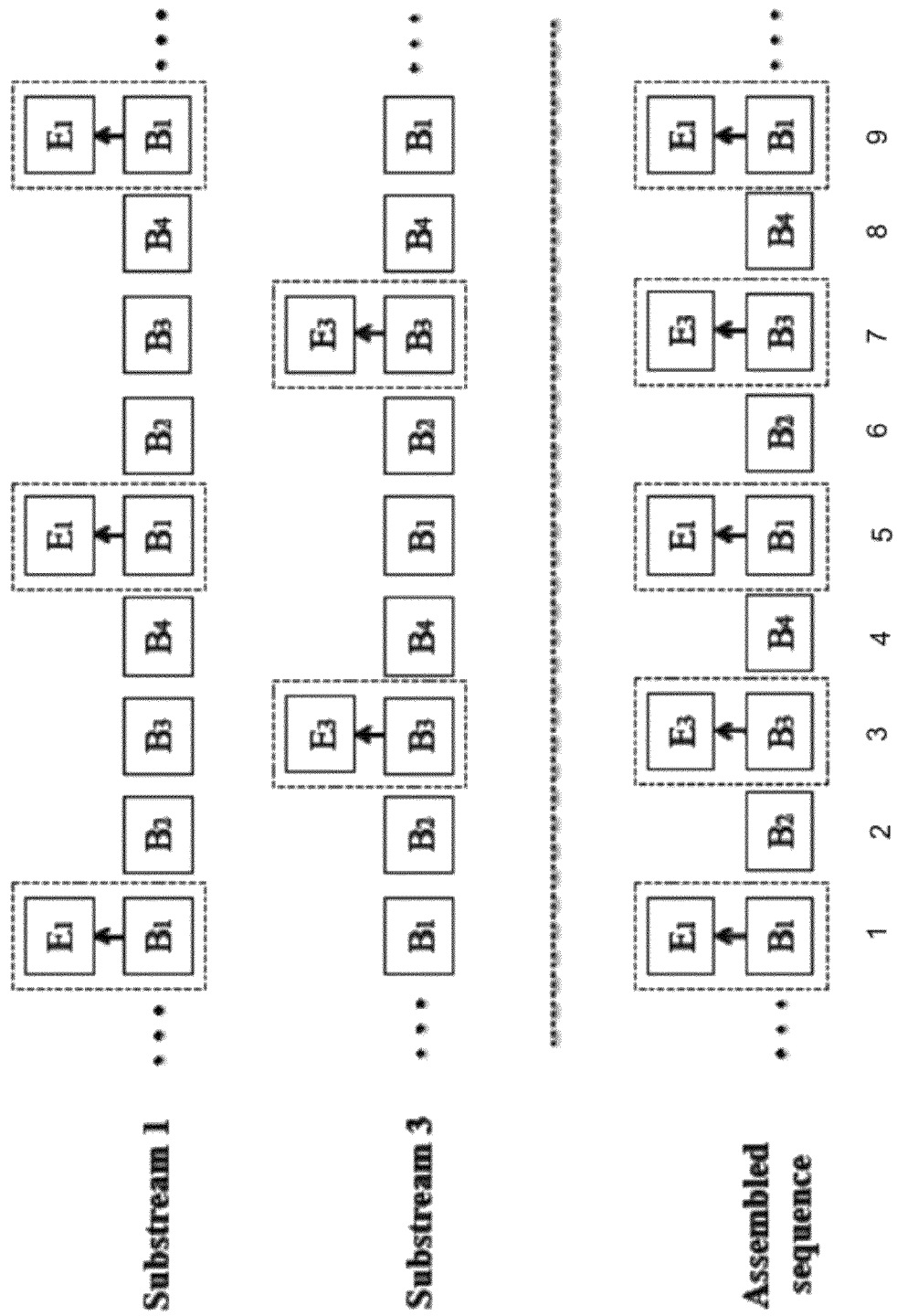
FIG. 8 depicts an assembling technique used by the device in FIG. 2 to reconstruct the original data stream.

After both the primary and secondary samples are decoded for all of the substreams, the outputs $X_{out}$ are merged by the P2P streaming module 248 into a unitary signal. During the merging process, a primary sample is fed into the output signal when both samples are present; otherwise, one of the co-located secondary samples is used to construct the output signal. FIG. 8 depicts a merging process where sub-streams 1 and 3 are received and decoded, but sub-streams 2 and 4 are missing. In particular, sub-stream 1, which is available to device 402 carried the primary samples for samples 1, 5, and 9, these primary samples are selected for the respective samples in the assembled sequence. Similarly for samples 3 and 7 in the assembly sequence, the primary samples in sub-stream 3 are selected. Because sub-stream 2 and 4 are missing, the primary samples for samples 2, 4, 6, and 8 in the assembled sequence are unavailable. However, the secondary samples are still available in sub-streams 1 and 3 which are then selected to replace the missing primary sample in sub-streams 2 and 4.

Since primary samples are encoded with finer quantization, the mobile user experiences the highest quality audio when all primary samples are available in the output signal. When one or more sub-streams are missing, graceful quality degradation is achieved by replacing the missing primary samples with secondary samples in other sub-streams. In addition, the sub-streams are functionally equivalent from the user point of view because the sub-streams contribute the same number of primary samples toward the output signal. As a result, missing a specific sub-stream does not significantly affect the quality of the final audio stream.

Distributed Transcoding for Stereo-Channel Audio

To stream a stereo-channel audio to a device 402 in FIG. 4, each channel of the original audio is separately transcoded and transmitted by the parent nodes (parents 1-K). The parent nodes are assigned to two groups, one of which is responsible for transcoding and transmitting the left channel and the other one for the right channel. In general, the streaming technique described herein is flexible, so that the two groups may or may not have the same number of parent nodes and may or may not have common parent nodes. In the following description, a four-parent embodiment is described as an example of the streaming method. However, one skilled in the art would appreciate that the method can be readily adopted for any number of parents.

Encoding

Figure 9:
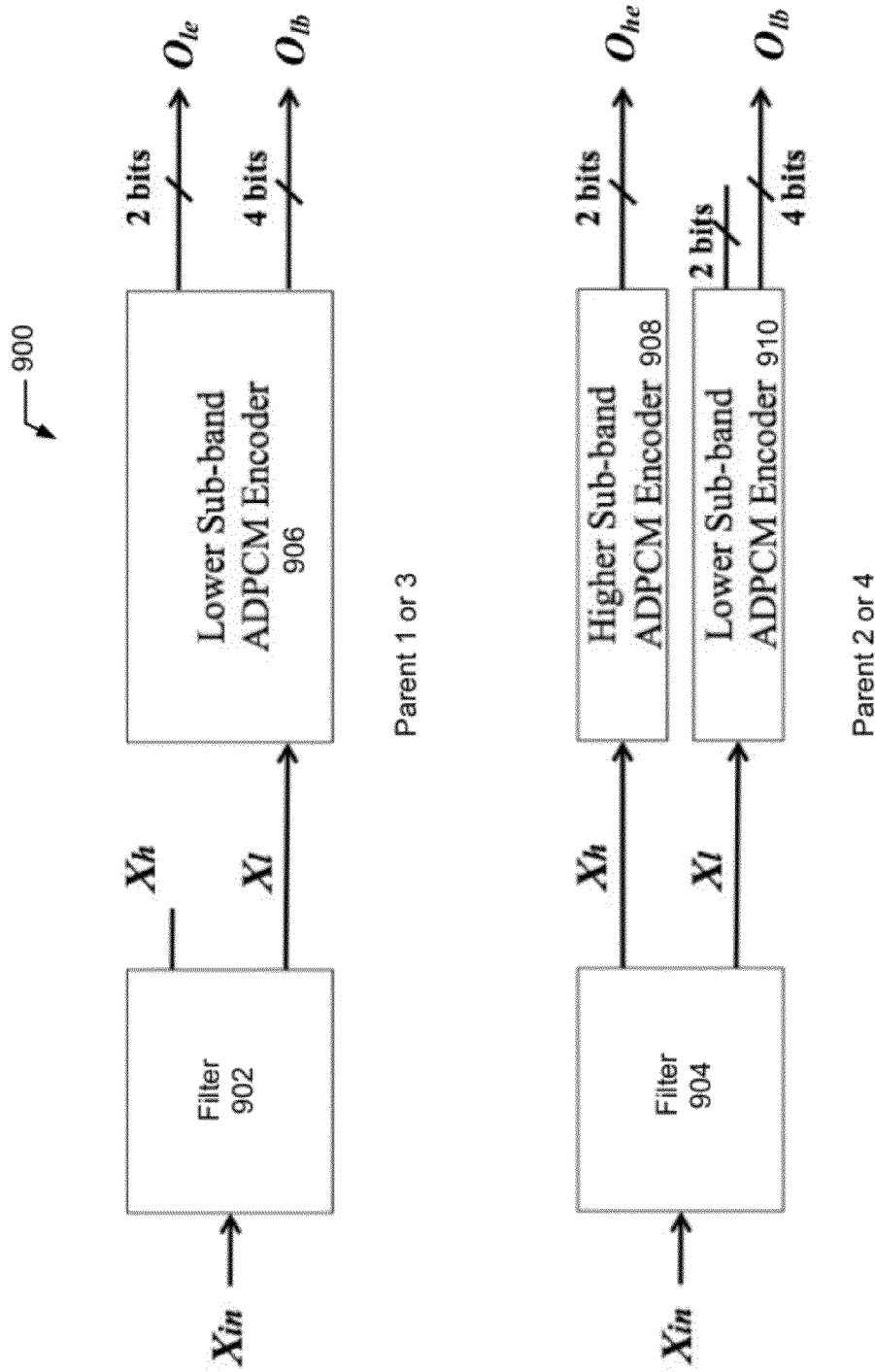
FIG. 9 depicts a schematic diagram of the encoder shown in FIG. 6A suitable for encoding stereo-channel signals.

Referring to FIG. 9, four (4) parents are used for distributed transcoding of a stereo-channel audio stream. In this embodiment, two of the four parents (parents 1 and 2) are assigned to the left channel and the other two (parents 3 and 4) are assigned to the right channel. First, the incoming audio signal is decoded to generate the left-channel and right-channel uncoded signal. Using filters 902 and 904, such as a quadrature mirror filter (QMF), the uncoded signal of each channel is split into the lower sub-band ($X_l$) and the higher subband ($X_h$) in the frequency domain. The lower sub-band signal ($X_l$) is encoded and split into two layer streams: the base layer $O_{lb}$, which provides basic audio characteristics when decoded, and the lower sub-band enhancement layer $O_{le}$, which contributes to quality improvement when decoded. The higher sub-band signal is encoded and the encoded output is called the higher sub-band enhancement layer $O_{he}$. After transcoding is complete, the base layer stream $O_{lb}$ is sent by both parents assigned for each channel. To achieve graceful quality degradation against network or parent failure, one parent of each channel (parents 1 and 3) sends the lower subband enhancement layer $O_{le}$, and the other parent of the channel (parents 2 and 4) sends the higher sub-band enhancement layer $O_{he}$. Repetition transmission of the base layer $O_{lb}$ provides a simple form of error-resilient coding and increases the availability of the base layer at the mobile receiver.

According to a further embodiment, the encoding scheme used by encoders 906, 908, and 910 shown in FIG. 9 can use the G.722 standard as described in "7 kHz audio-coding within 64 kbit/s," ITU-T Recommendation G.722 (11/88), November, 1988 (hereinafter G.722 Standard), which is hereby incorporated by reference in its entirety. The G.722 encoder uses the sub-band adaptive differential pulse code modulation (SB-ADPCM), which is described in the G.722 Standard. Each parent has at least one dedicated G.722 encoders. Overall, the four G.722 encoders produce four identical 32 kbps bitstreams including four most significant bits (out of six bits) for the lower sub-band, two (left and right) 16 kbps bitstreams including two least significant bits (out of six bits), and two (left and right) 16 kbps bitstreams including the higher sub-band two bits (64 kbps in total).

According to one embodiment shown in FIG. 9, in a four-parent system 900, Parent 1 encodes and delivers the lower sub-band four most significant bits ($O_{lb}$) and the lower sub-band two least significant bits ($O_{le}$) of the left channel. Parent 2 encodes and delivers the lower sub-band four most significant bits ($O_{lb}$) and the higher sub-band two bits ($O_{he}$) of the left channel. Parent 3 encodes and delivers the lower sub-band four most significant bits ($O_{lb}$) and the lower sub-band two least significant bits ($O_{le}$) of the right channel. Parent 4 encodes and delivers the lower sub-band four most significant bits ($O_{lb}$) and the higher sub-band two bits ($O_{he}$) of the right channel.

The bitrate of the sub-stream generated by each parent is 48 kbps. All the sub-streams add up to the total bitrate of 192 kbps, which incurs 50% redundancy as opposed to the case with no duplication transmission. Since the bit rate of the raw input signal is 16*16*2=512 kbps, sampled at 16 KHz, 16 bits per sample for left/right channels, the encoding scheme results in a bitrate of 38% of the original bitrate.

Decoding

Since the sub-streams for each channel are encoded separately, decoding is also independently performed when device 402 receives the sub-streams from the parents. The decoding of the sub-streams is provided by decoder 247 or 261 shown in FIG. 2. In general, device 402 may use one decoder to decode all of the sub-streams for both left and right channels and then assemble the data to reconstruct the original stereo-channel audio when all of the sub-streams are decoded. Alternatively, there may be more than one decoder 247 or 261 in device 402, each of which is assigned to either left or right channels. The substreams associated with the left and right channels are then decoded and assembled in parallel.

Figure 10:
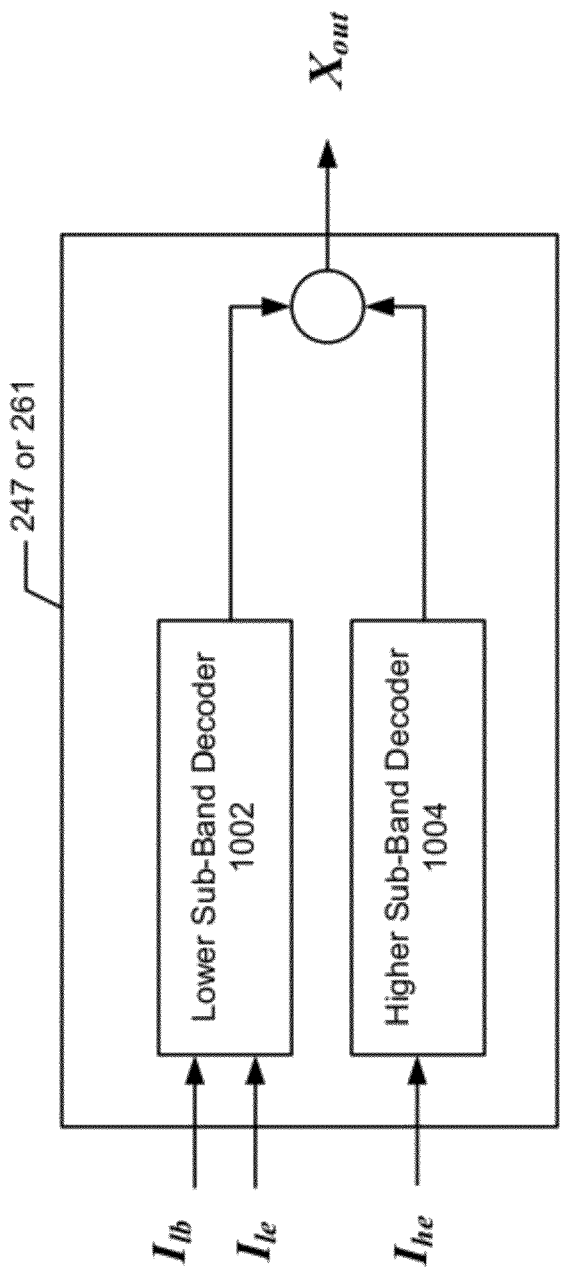
FIG. 10 depicts a schematic diagram of the decoder shown in FIG. 2 suitable for decoding stereo-channel signals.

Referring to FIG. 10, if any one of the two sub-streams associated with the same channel is available to the decoder, which includes lower sub-band decoder 1002 and higher sub-band decoder 1004, the base layer ($I_{lb}$) for that channel can be successfully decoded, if an enhancement layer ($I_{le}$ or $I_{he}$) is available to the decoder, it is decoded and mixed into the output signal $X_{out}$. If none of the sub-streams associated with the first channel is available, the decoder fails to decode the channel. In this situation, if the sub-streams associated with the second channel are successfully decoded, then the decoded signal for the second channel is copied to the first channel to produce a mono-channel signal until the sub-streams for the first channel become available. Each decoder can use the a G.722 decoder or any decoding technique suitable for decoding the sub-streams.

As shown in FIG. 10, if all the sub-streams ($I_{lb}$, $I_{le}$, and $I_{he}$) are received from the parents at the decoder, the full stereo, wide-band audio signal is decoded. When a lower sub-band enhancement layer bitstream ($I_{le}$) is received, it augments the corresponding base layer bitstream. When a higher sub-band enhancement layer bitstream ($I_{he}$) is received, it is fed into the decoder and mixed with the lower sub-band signal to produce a unitary signal. In general, any of the sub-streams can be decoded independently and the audio quality improves as more sub-streams are available.

Application

The transcoding technique described herein can be directly applied to a distributed audio streaming system, such as distributed media servers or Peer-to-Peer based systems. For instance, the transcoding technique has been implemented in the P2P system developed at Stanford for streaming video to mobile users, which is described in J. Noh, P. et al., "Stanford Peer-to-Peer Multicast (SPPM) overview and recent extensions," Proc. of International Picture Coding Symposium (PCS), Chicago, Ill., USA, May 2009. The SPPM system can deliver both audio and video streams to mobile users using the transcoding technique described herein.

The transcoding technique can also be applied to a reliable system or a system including reliable and unreliable components. When a reliable component is present, some reliable entity may stream the base layer and eliminate its duplication transmission. Enhancement layers can then be transmitted by either the reliable/unreliable entity. Since the availability of the base layer stream is not affected when individual parents become unavailable, mobile receivers can always receive the base layer stream as long as at least one parent is available.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for streaming audio data in a network, wherein the audio data include a sequence of samples, the method comprising:
   encoding, by a processor, the sequence of samples into a plurality of coded base streams;
   generating a plurality of enhancement streams, wherein each of the enhancement streams is generated from one of a plurality of non-overlapping portions of the sequence of samples;
   transmitting the coded base streams and the enhancement streams to a receiver for decoding;
   assigning an identifier to each of the plurality of coded base streams and each of the plurality of enhancement streams; and
   selecting one of the non-overlapping portions of the sequence of samples for generating an enhancement stream based on the identifier of the enhancement stream.

2. The method of claim 1, wherein the plurality of coded base streams and the plurality of enhancement streams have the same number of streams, and each enhancement bitstream is transmitted with a respective coded base stream.

3. The method of claim 1, wherein the plurality of coded bitstreams carries substantially identical information of the audio data.

4. The method of claim 1, further including:
   identifying a plurality of network nodes that provides the audio data;
   requesting the audio data from the plurality of network nodes; and
   generating at each of the plurality of network nodes one of the plurality of coded base streams and one of the plurality of enhancement streams.

5. The method of claim 1, wherein each of the plurality of coded base streams carries basic components of the entire sequence of samples and, when individually decoded, provides the entire sequence of samples with a basic quality, and
   wherein each of the plurality of enhancement streams, when decoded with the associated coded base stream, provides the respective non-overlapping portion of the sequence of samples with an enhanced quality.

6. The method of claim 5, wherein the plurality of coded base streams carry information in a lower sub-band of the audio data, and the plurality of enhancement streams carry information in a higher sub-band of the audio data.

7. The method of claim 6, further including filtering the audio data into the lower and higher sub-bands.

8. The method of claim 1, further including selecting the each non-overlapping portion of the sequence of samples in time domain.

9. A method for streaming audio data in a network, wherein the audio data include a sequence of samples, the method comprising:
   receiving a plurality of bitstreams, wherein each of the bitstreams includes a base stream and an enhancement stream, and each base stream includes information of the entire sequence of samples and each enhancement stream includes a non-overlapping portion of the sequence of samples;
   decoding, by a processor, the plurality of bitstreams; and
   assembling the decoded bitstreams into a reconstructed copy of the sequence of samples.

10. The method of claim 9, further including:
    assigning an identifier to each of the plurality of bitstreams; and
    assembling the decoded bitstreams based on the identifiers of the plurality of bitstreams.

11. The method of claim 10, further including:
    detecting that at least a portion of a first one of the plurality of bitstreams is missing;
    selecting a second one of the plurality of bitstreams; and
    substituting a corresponding portion of the second bitstream for the missing portion of the first bitstream.

12. The method of claim 11, wherein the second one of the plurality of bitstreams is selected based on the identifier of the first bitstream.

13. The method of claim 9, further including:
    identifying a plurality of network nodes having the audio data;
    requesting that each of the plurality of network nodes generate one of the plurality of bitstreams.

14. The method of claim 13, further including:
    detecting that one of the plurality of network nodes becomes unavailable; and
    substituting a bitstream generated by one of the remaining network nodes for the bitstream generated by the unavailable network node.

15. The method of claim 9, further including:
    decoding the base stream; and
    decoding the enhancement stream based on the decoded base stream.

16. A system for streaming audio data in a network, the audio data including a sequence of samples, the system comprising:
    at least one parent node configured to encode the sequence of samples into a plurality of bitstreams using a processor, each of the bitstreams including a base stream and an enhancement stream, wherein each base stream carries information of the entire sequence of samples, and each enhancement stream carries one of a plurality of non-overlapping portions of the sequence of samples, the at least one parent node further configured to transmit the plurality of bitstreams; and
    a receiving node configured to receive and decode the plurality of base streams and the plurality of enhancement streams, the receiving node further configured to assemble the decoded base streams and enhancement streams into a reconstructed copy of the sequence of samples.

17. The system of claim 16, wherein the receiving node is further configured to identify the at least one parent node that has the audio data stored thereon and request the at least one parent node transmit the audio data to the receiving node.

18. The system of claim 17, wherein the at least one parent node includes a plurality of parent nodes, each of the parent nodes being configured to generate one of the plurality of base streams and one of the plurality of enhancement streams, and the receiving node is configured to assign an identifier to each of the plurality of parent nodes.

19. The system of claim 18, wherein each of the plurality of parent nodes is configured to generate the respective enhancement stream based on its identifier.

20. The system of claim 19, wherein each of the plurality of parent nodes is configured to select at least one sample from the sequence of samples based on its identifier.

21. The system of claim 18, wherein the receiving node is further configured to assemble the decoded base streams and enhancement streams based on the identifiers of the plurality of parent nodes transmitting the base streams and the enhancement streams.

22. The system of claim 21, wherein the receiving node is configured to select a base stream and an enhancement stream so as to generate a reconstructed copy of a sample based on a mapping relationship between the position of the sample within the sequence of sample and the identifier of the parent node transmitting the base stream and the enhancement stream.

23. The system of claim 18, wherein the receiving node is further configured to detect that at least a portion of a first one of the plurality of bitstreams is missing and to select a second one of the plurality of bitstreams to substitute for the missing portion of the first bitstream.

24. The system of claim 23, wherein the receiving node is configured to select the second one of the plurality of bitstreams based on the identifier of the parent node transmitting the first one of the plurality of bitstreams.

25. The system of claim 18, wherein the receiving node is further configured to detect that one of the plurality of parent nodes is unavailable and to select another one of the plurality of parent nodes to substitute for the missing parent node.

26. The system of claim 25, wherein the receiving node is configured to select the another one of the plurality of parent nodes based on the identifier of the unavailable parent node.

27. A computer readable medium comprising computer codes, when executed by one or more digital processors, the computer codes instructing the one or more digital processors to provide audio data streaming in a network, wherein the audio data include a sequence of samples, the computer codes comprising:
    instructions for encoding the sequence of samples into a plurality of coded base bitstreams;
    instructions for generating a plurality of enhancement streams, wherein each of the enhancement streams is generated from one of a plurality of non-overlapping portions of the sequence of samples;
    instructions for transmitting the coded base streams and the enhancement streams to a receiver for decoding;
    instructions for assigning an identifier to each of the plurality of coded base streams and each of the plurality of enhancement stream; and
    instructions for selecting one of the non-overlapping portions of the sequence of samples for generating an enhancement stream based on the identifier of the enhancement stream.

28. The computer readable medium of claim 27, the computer codes further comprising:
    instructions for identifying a plurality of network nodes that provides the audio data;
    instructions for requesting the audio data from the plurality of network nodes; and
    instructions for generating at each of the plurality of network nodes one of the plurality of coded base streams and one of the plurality of enhancement streams.

29. A computer readable medium comprising computer codes, when executed by one or more digital processors, the computer codes instructing the one or more digital processors to provide audio data streaming in a network, wherein the audio data include a sequence of samples, the computer codes comprising:
    instructions for receiving a plurality of bitstreams, wherein each of the bitstreams includes a base stream and an enhancement stream, and each base stream includes information of the entire sequence of samples and each enhancement stream includes a non-overlapping portion of the sequence of samples;
    instructions for decoding the plurality of bitstreams; and
    instructions for assembling the decoded bitstreams into a reconstructed copy of the sequence of samples.

30. The computer readable medium of claim 29, the computer codes further comprising:
    instructions for assigning an identifier to each of the plurality of bitstreams, and
    instructions for assembling the decoded bitstreams based on the identifiers of the plurality of bitstreams.

31. The computer readable medium of claim 29, the computer codes further comprising:
    instructions for detecting that at least a portion of a first one of the plurality of bitstreams is missing;

instructions for selecting a second one of the plurality of bitstreams; and instructions for substituting a corresponding portion of the second bitstream for the missing portion of the first bitstream.

32. The computer readable medium of claim 29, the computer codes further comprising:

instructions for identifying a plurality of network nodes having the audio data;

instructions for requesting that each of the plurality of network nodes generate one of the plurality of bitstreams.

33. The computer readable medium of claim 32, the computer codes further including:

instructions for detecting that one of the plurality of network nodes becomes unavailable; and instructions for substituting a bitstream generated by one of the remaining network nodes for the bitstream generated by the unavailable network node.

* * * * *